(12) United States Patent
Ullrich et al.

(10) Patent No.: US 9,581,613 B2
(45) Date of Patent: Feb. 28, 2017

(54) MICROMECHANICAL ACCELERATION SENSOR

(71) Applicant: Robert Bosch GmbH, Stuttgart (DE)

(72) Inventors: Guenther Nino-Carlo Ullrich, Reutlingen (DE); Lars Tebje, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/734,656

(22) Filed: Jun. 9, 2015

(65) Prior Publication Data
US 2015/0355217 A1 Dec. 10, 2015

(30) Foreign Application Priority Data
Jun. 10, 2014 (DE) .......................... 10 2014 211 054

(51) Int. Cl.
*G01P 15/10* (2006.01)
*G01P 15/097* (2006.01)
(Continued)

(52) U.S. Cl.
CPC .......... *G01P 15/097* (2013.01); *G01P 15/125* (2013.01); *G01P 2015/0831* (2013.01)

(58) Field of Classification Search
CPC ........................ G01P 2015/0831; G01P 15/097
See application file for complete search history.

(56) References Cited

U.S. PATENT DOCUMENTS 5,677,487 A * 10/1997 Hansen ............... G01P 15/0915
310/329
6,038,924 A * 3/2000 Lee .......................... G01P 15/09
310/329

(Continued)

FOREIGN PATENT DOCUMENTS

DE        19719779        11/1998
DE        102008001442   11/2009
WO        WO 03104823 A1 * 12/2003 ............ G01P 15/125

*Primary Examiner* — Laura Martin
*Assistant Examiner* — Samir M Shah
(74) *Attorney, Agent, or Firm* — Gerard Messina

(57) ABSTRACT

A micromechanical acceleration sensor is provided, including
  a substrate,
  a first seismic mass, which is movably suspended on the substrate and deflectable in an acceleration acting on the substrate in a first direction,
  first detection means for detecting a deflection of the first seismic mass in an acceleration acting on the substrate in the first direction,
  a second seismic mass, which is movably suspended on the substrate and deflectable in an acceleration acting on the substrate in a second direction, the second direction running perpendicularly to the first direction,
  second detection means for detecting a deflection of the second seismic mass in an acceleration acting on the substrate in the second direction,
  the second seismic mass furthermore being deflectable in an acceleration acting on the substrate in a third direction, the third direction running perpendicularly to the first direction and to the second direction, and
  third detection means for detecting a deflection of the second seismic mass in an acceleration acting on the substrate in the third direction.

3 Claims, 6 Drawing Sheets

(51) Int. Cl.
*G01P 15/125* (2006.01)
*G01P 15/08* (2006.01)

(56) References Cited

U.S. PATENT DOCUMENTS

| | | | | |
|---|---|---|---|---|
| 2006/0021436 A1* | 2/2006 | Kapser | ................. | G01P 15/125 73/514.38 |
| 2008/0276706 A1* | 11/2008 | Hartmann | .......... | G01C 19/5747 73/504.04 |
| 2009/0241669 A1* | 10/2009 | Wilner | ................. | G01P 15/123 73/514.33 |

* cited by examiner

MICROMECHANICAL ACCELERATION SENSOR

FIELD OF THE INVENTION

The present invention relates to a micromechanical acceleration sensor.

BACKGROUND INFORMATION

German Published Patent Application No. 197 19 779 A1 describes an acceleration sensor having an oscillating structure, which is movably suspended on a substrate, deflectable as a result of an acceleration effect and developed in the form of a seismic mass; it also includes an evaluation means for detecting a deflection of the oscillating structure caused by an acceleration. The seismic mass is deflectable in one direction only, so that accelerations in only a single direction are able to be detected. In other words, in the known acceleration sensor one seismic mass per acceleration direction is provided for detecting an acceleration.

German Published Patent Application No. 10 2008 001 442 A1 describes a micromechanical component, which includes a substrate having a seismic mass. The mass is deflectable in different directions for different accelerations acting on the substrate. Thus, only a single seismic mass is used for detecting accelerations in different directions. In the case of the known micromechanical component it may happen for space-related reasons that a deflection of the seismic mass caused by an acceleration in a first direction is less well detectable than a deflection of the seismic mass caused by an acceleration in a second direction. In other words, accelerations in different directions can be detected with variable degrees of success.

SUMMARY

An object of the present invention may thus be regarded as providing a micromechanical acceleration sensor which overcomes the known disadvantages.

According to one aspect, a micromechanical acceleration sensor is provided, which includes a substrate, a first seismic mass, which is movably suspended on the substrate and deflectable in an acceleration acting on the substrate in a first direction, first detection means for detecting a deflection of the first seismic mass in an acceleration acting on the substrate in the first direction, a second seismic mass, which is movably suspended on the substrate and deflectable in an acceleration acting on the substrate in a second direction, the second direction running perpendicularly to the first direction, second detection means for detecting a deflection of the second seismic mass in an acceleration acting on the substrate in the second direction, the second seismic mass furthermore being deflectable in an acceleration acting on the substrate in a third direction, the third direction running perpendicularly to the first direction and to the second direction, and third detection means for detecting a deflection of the second seismic mass in an acceleration acting on the substrate in the third direction.

The fact that the first mass is provided only or exclusively for detecting the acceleration in the first direction and additionally not for the detection in the second and/or third directions as well, provides the particular technical advantage of being able to optimize the first mass and its corresponding placement on the substrate with regard to an optimal deflection resulting from an acceleration in the first direction. For since there is no need to use the first mass for detecting accelerations in the second and third directions as well, no compromises with regard to the design and placement are required in order to additionally also detect these accelerations with the aid of the first mass. The second seismic mass is provided to detect the accelerations in the second and third directions.

As a result, the first mass may advantageously compensate for a possible detection weakness of accelerations in the first direction of the second seismic mass. In other words, the present invention in particular encompasses the idea of providing a substrate having two seismic masses, one mass being used exclusively for detecting accelerations in the first direction, and the other mass being used exclusively for detecting a particular acceleration in the second direction and the third direction. The first mass thus advantageously compensates for a detection weakness of the second mass. The second mass may basically also be used for detecting accelerations in the first direction, but this is not the case in the present invention. Instead, the second mass is used exclusively for detecting accelerations in the second and third directions.

A single seismic mass may indeed suffice for detecting accelerations in three directions, as illustrated by German Published Patent Application No. 10 2008 001 442 A1. However, the detection may be of different qualities for the three directions. If three acceleration sensors were then used for detecting accelerations in three different directions, as known from German Published Patent Application No. 197 19 779 A1, such an approach would require considerable space. For three seismic masses are necessary in this approach. The present invention provides an advantageous compromise between the lowest space requirement possible and an efficient detection of accelerations in three different directions. This is attributable to the fact that it makes do with only two seismic masses (lower space requirement than three seismic masses) but still provides a sensitive detection of the accelerations (the first mass for one direction, the second mass for the two other directions). Contrary to the technical teaching of German Published Patent Application No. 10 2008 001 442 A1, a detection of accelerations in three different directions using a single seismic mass is dispensed with. Instead, two acceleration directions are recorded using one mass, and the third acceleration direction is recorded using the other mass. Nevertheless, it is essentially also possible to additionally use the second mass for the acceleration direction detected by the first mass. However, so-called offset errors may arise as the result of deformations, for example, i.e., a signal resulting from a deformation and not from an acceleration effect in this direction. The second mass is generally susceptible to such offset faults when a measurement or detection of an acceleration in this direction is involved. However, since said acceleration effect is detected with the aid of the first mass, in particular, this offset sensitivity no longer plays a role. The first mass compensates for the particular weakness of the second mass.

The fact that the second seismic mass, for example, is deflectable in two different acceleration directions provides the technical advantage of making the second seismic mass less sensitive with respect to deformations, especially if the second seismic mass is suspended on the substrate with the aid of a torsion spring.

The first seismic mass having the first detection means and the second seismic mass having the second and third detection means form a sensor core in each case. A sensor core in which one seismic mass is provided per sensing direction, i.e., the direction in which the acceleration is to be detected, may be called a multi-mass oscillator, in particular. This is so because multiple masses must be used for detecting accelerations in different directions. A sensor core in which one mass is employed for multiple sensing directions may be called a single-mass oscillator, in particular. A plurality of sensor cores (single-mass oscillators) are combined or joined together in this sensor core. The present invention thus combines a single-mass oscillator for two sensing directions with a multi-mass oscillator for one sensing direction.

In one specific embodiment, the seismic masses (or sensor cores) include a micromechanical structure made from silicon. This provides the particular technical advantage that the production of the acceleration sensor can be realized using photolithographic processes.

According to one specific embodiment, an evaluation electronics system is provided for analyzing signals from the detection means (first and/or second and/or third). This provides the particular technical advantage that the signals from the detection means are able to be analyzed, so that the acceleration that corresponds to the particular direction is ascertainable on this basis.

In one specific embodiment, the first seismic mass is deflectable in a translatory manner in the first direction exclusively. For example, this provides the technical advantage that the acceleration in the first direction is detectable in a particularly uncomplicated manner. That the first seismic mass is deflectable in the first direction exclusively, for example, may be the result of a soft suspension of the first mass on the substrate in the first direction and a rigid suspension of it in a direction running perpendicularly thereto.

In one further specific embodiment, the second seismic mass is deflectable in a translatory manner in the second direction in an acceleration acting on the substrate in the second direction. For example, a translatory deflection provides the technical advantage of allowing the deflection to be recorded in an especially simple manner.

According to another specific embodiment, in an acceleration acting on the substrate in the third direction, the second seismic mass is rotationally deflectable about an axis of rotation that extends perpendicularly to the third direction. For instance, this provides the technical advantage that in an acceleration in the third direction, the seismic mass is deflectable in a particularly uncomplicated manner, so that a sensitive detection of this acceleration takes place. The second seismic mass, for example, has an asymmetrical mass distribution about the axis of rotation. This provides the special technical advantage that in an acceleration in the third direction, a total torque acting on the second seismic mass is unequal to zero, which ultimately leads to a rotation about the axis of rotation.

In another specific embodiment, the second seismic mass is movably suspended on the substrate with the aid of a spring, especially a torsion spring. The axis of rotation in particular corresponds to a longitudinal axis of the spring.

According to another specific embodiment, the detection means, i.e., the first and/or the second, and/or the third detection means, include(s) electrodes. The first and/or the second seismic mass include(s) counter electrodes corresponding to these electrodes, so that the electrodes and the counter electrodes form a capacitor or multiple capacitors in each case. For example, this provides the specific technical advantage of inducing a capacitive detection of the deflection of the seismic mass. The third detection means, for instance, includes one or more electrode(s), which is/are situated on the substrate.

In one specific embodiment, at least some of the electrodes and the corresponding counter electrodes have a comb structure, so that the electrodes and the counter electrodes engage with each other in a comb-like manner. For example, this provides the specific technical advantage that a multitude of capacitors taking up minimal space is formed, which enables a sensitive detection of the acceleration. Electrodes and counter electrodes, each having a comb structure, may particularly also be referred to as comb electrodes.

According to one specific embodiment, the substrate is a circuit board. For example, this provides the specific technical advantage of enabling an uncomplicated electrical contacting of the detection means. Circuit tracks of the circuit board form electrodes of the third detection means, for instance.

DETAILED DESCRIPTION

Figure 1:
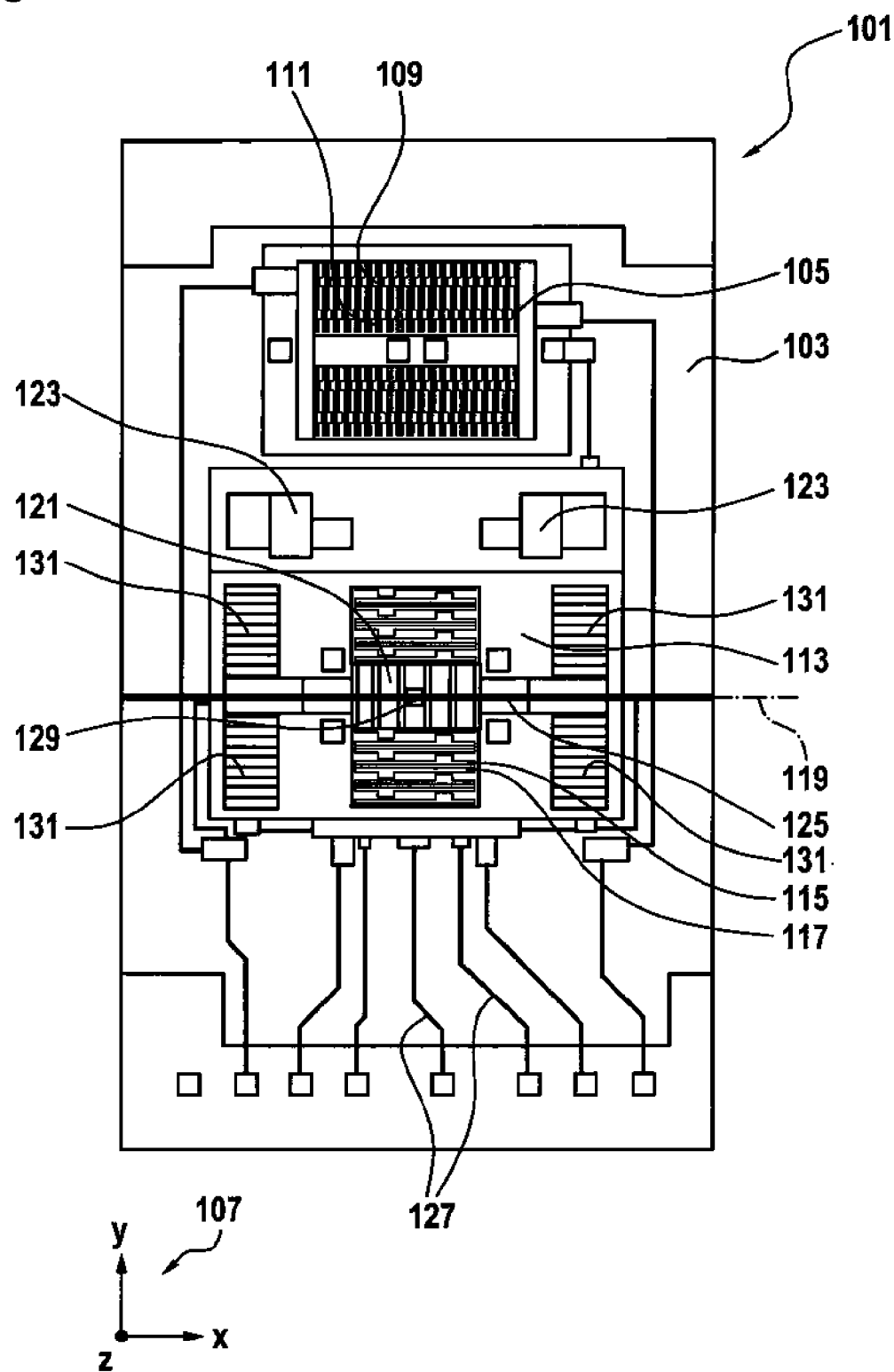
FIG. 1 shows a plan view of a micromechanical acceleration sensor.

Identical reference numerals may be used in the following text for identical features.

FIG. 1 shows a plan view of a micromechanical acceleration sensor 101.

Micromechanical acceleration sensor 101 includes a substrate 103. A first seismic mass 105 is provided, which is suspended on substrate 103 in a movable manner and deflectable in a translatory manner in an acceleration acting on the substrate in a first direction. The first direction corresponds to the x-axis of an x, y, z coordinate system 107. Furthermore, comb electrodes 109, i.e., electrodes having a comb structure, are provided as first detection means in order to detect a deflection of first seismic mass 105 in an acceleration acting on substrate 103 in the first direction. First seismic mass 105 includes corresponding counter electrodes 111, which are likewise developed in the form of comb electrodes. Counter electrodes 111 and comb electrodes 109 form capacitors, so that a capacitive detection of a deflection of first seismic mass 103 in the x-direction takes place. First seismic mass 105 is deflectable in the first direction (x-direction) exclusively, which, for example, is realized in that first mass 105 is softly suspended on substrate 103 in the first direction and rigidly suspended in a direction (y-direction) which is perpendicular thereto.

In addition, a second seismic mass 113 is provided, which is movably suspended on substrate 103 and deflectable in a translatory manner in an acceleration acting on substrate 103 in a second direction, the second direction extending perpendicularly to the first direction. The second direction corresponds to the y-axis of x, y, z coordinate system 107. Analogously to comb electrodes 109, comb electrodes 115 are formed as second detection means for detecting a deflection of second seismic mass 113 in an acceleration acting on substrate 103 in the second direction. Corresponding counter electrodes, having a comb structure, of seismic mass 113 have been provided with reference numeral 117. A capacitive detection of a deflection of second seismic mass 105 in the y-direction is induced accordingly.

In an acceleration acting on the substrate in a third direction, second seismic mass 113 is rotationally deflectable about an axis of rotation 119, which extends perpendicularly to the third direction, the third direction extending perpendicularly to the first direction and to the second direction. The third direction corresponds to the z-axis of x, y, z coordinate system 107. In a rotation in the z-direction, second seismic mass 113 tilts, in a manner similar to a rocker, about axis of rotation 119, which extends through second seismic mass 113, a mass distribution of second seismic mass 113 being asymmetrical in relation to axis of rotation 119. Electrodes 121 are formed on substrate 103 which, together with corresponding counter electrodes (not shown), form capacitors on a side of second seismic mass 113 facing substrate 103, so that a capacitive detection of the tilting movement takes place. Electrodes 121 are developed in the form of circuit tracks, for example. This is the case particularly if substrate 103 is developed as a circuit board, which is the case according to one specific embodiment. Electrodes 121 therefore form third detection means for detecting a deflection of second seismic mass 113 in an acceleration acting on substrate 103 in the third direction.

Reference numeral 123 points to fixed stops for an overload, which are connected to substrate 103. Reference numeral 125 points to a spring with the aid of which second seismic mass 113 is movably suspended on substrate 103. Spring 125 is developed as a torsion spring, in particular. Axis of rotation 119 extends through a longitudinal direction of spring 125. Reference numeral 127 points to wiring connections, by which, for example, the electrodes and counter electrodes are connected and electrically contacted. Reference numeral 129 points to a connection region where spring 125 is connected to substrate 103. Reference numeral 131 points to comb electrode structures which may be used for detecting an acceleration effect in the x-direction, because here, second seismic mass 113 would rotate about an axis of rotation that extends parallel to the z-axis and through connection region 129. However, this x-acceleration effect is detected with the aid of first seismic mass 105. Comb electrode structures 131 may thus be omitted. Instead, second seismic mass 113 may be enlarged in accordance with the vacated regions (see FIGS. 2, 3, 5, and 6).

In response to a deformation of substrate 103, these comb electrode structures 131 would be deflected despite the fact that no acceleration in the x-direction is taking place. That is to say, a signal would be measured that, however, would not correspond to any acceleration in the x-direction. Such a signal can be referred to as an offset error. However, on account of its soft suspension in the x-direction and its rigid suspension in the y-direction, first seismic mass 105 is less sensitive with respect to such deformations than second seismic mass 113. The detection weakness of second seismic mass 113 in the x-direction is advantageously compensated for by first seismic mass 105.

Figure 2:
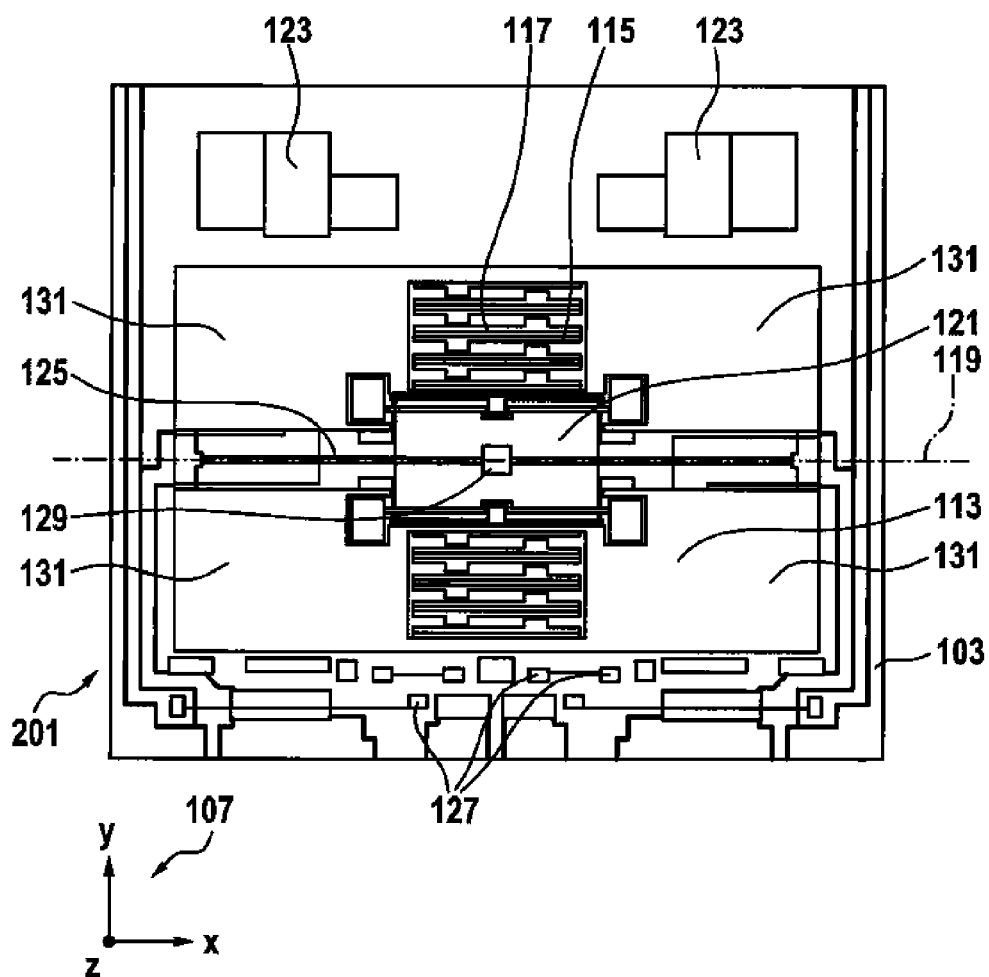
FIG. 2 shows a partial plan view of a further micromechanical acceleration sensor.

FIG. 2 shows a partial plan view of a further micromechanical acceleration sensor 201, which has a similar design as micromechanical acceleration sensor 101 from FIG. 1. It is a partial plan view because first seismic mass 105 is not depicted. It is developed analogously to FIG. 1. In contrast to FIG. 1, no further comb electrode structures 131 are developed. The space that has become available is now taken up by second seismic mass 113, which has a correspondingly larger form. For better illustration, reference numeral 131 is shown in FIG. 2 nevertheless. It now no longer points to comb electrode structures but to the enlarged regions of second seismic mass 113.

Figure 3:
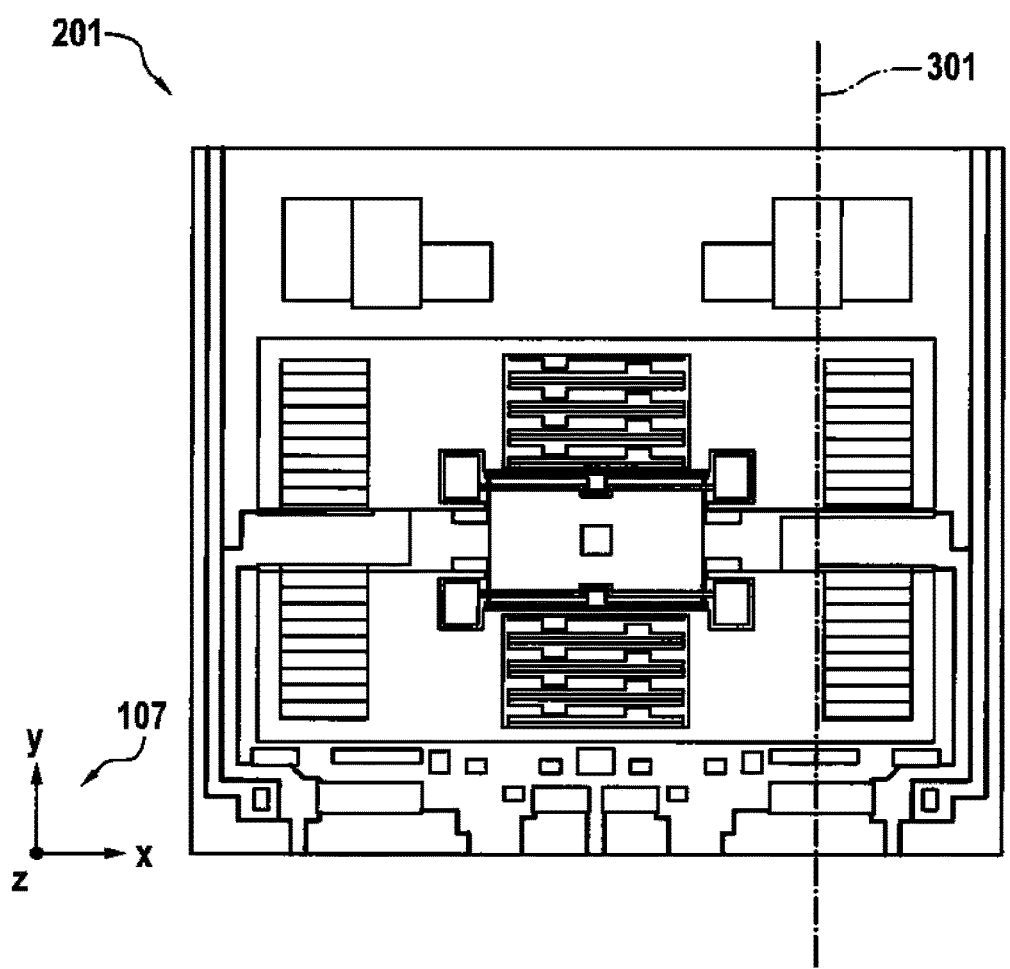
FIG. 3 shows the micromechanical acceleration sensor from FIG. 2 with a sectional line.

FIG. 3 shows the same view as FIG. 2. For reasons of clarity, most of the reference numerals have been omitted. Reference numeral 301 points to a sectional line.

Figure 4:
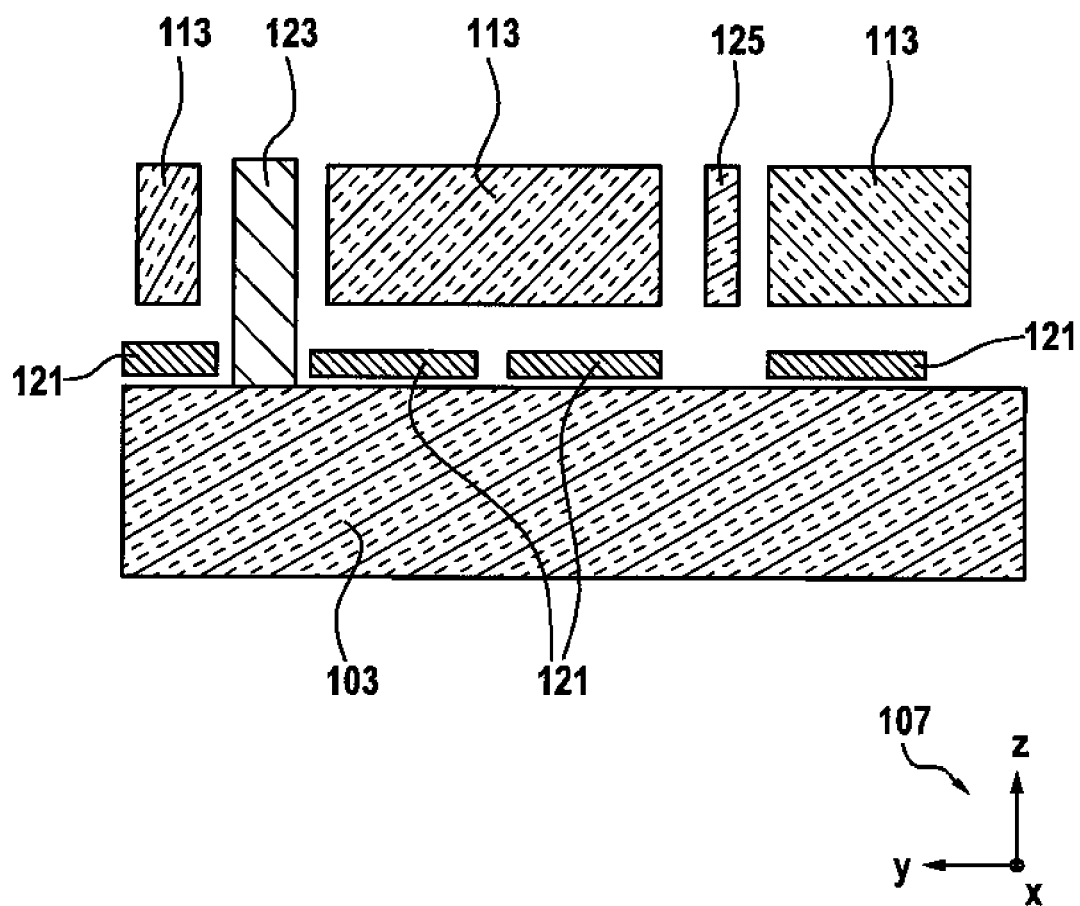
FIG. 4 shows a sectional view along the sectional line from FIG. 3.

FIG. 4 shows the sectional view along sectional line 301.

Figure 5:
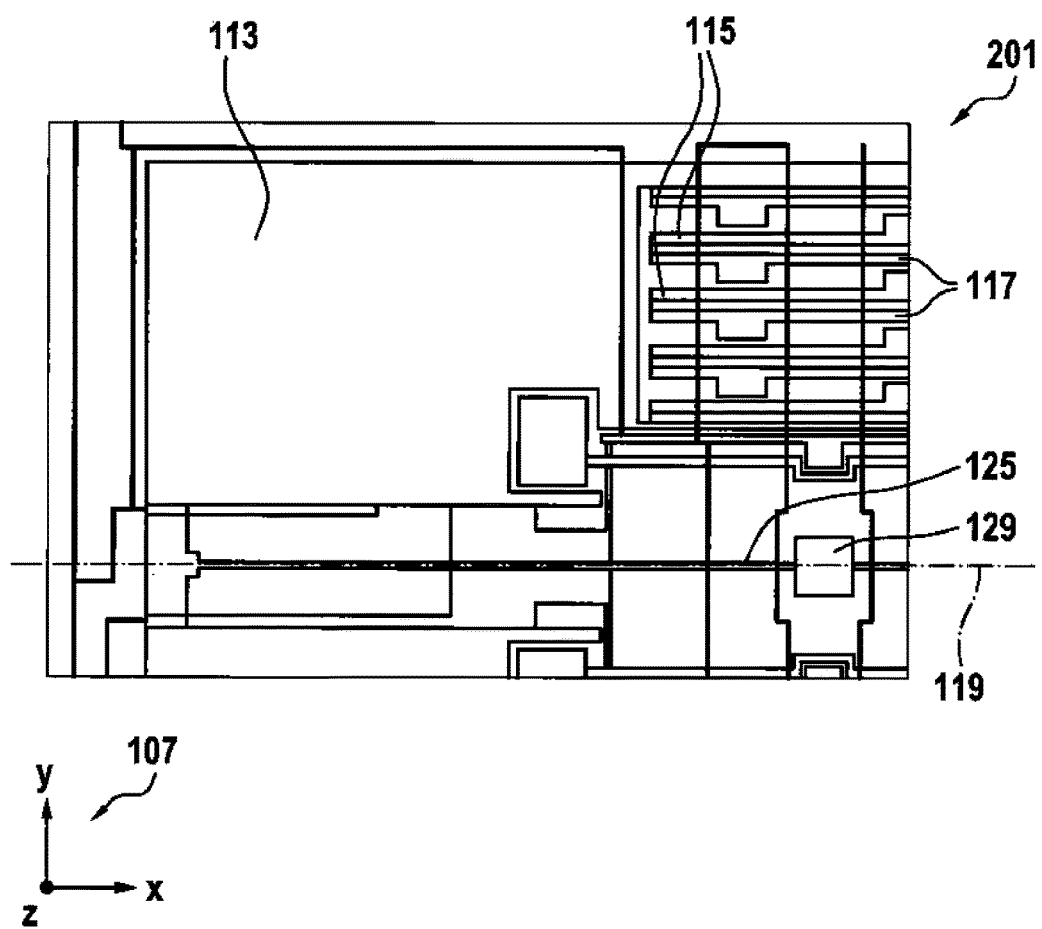
FIG. 5 shows a detail view of the micromechanical acceleration sensor from FIG. 2.

FIG. 5 shows a detail view of micromechanical acceleration sensor 201 from FIG. 2.

Figure 6:
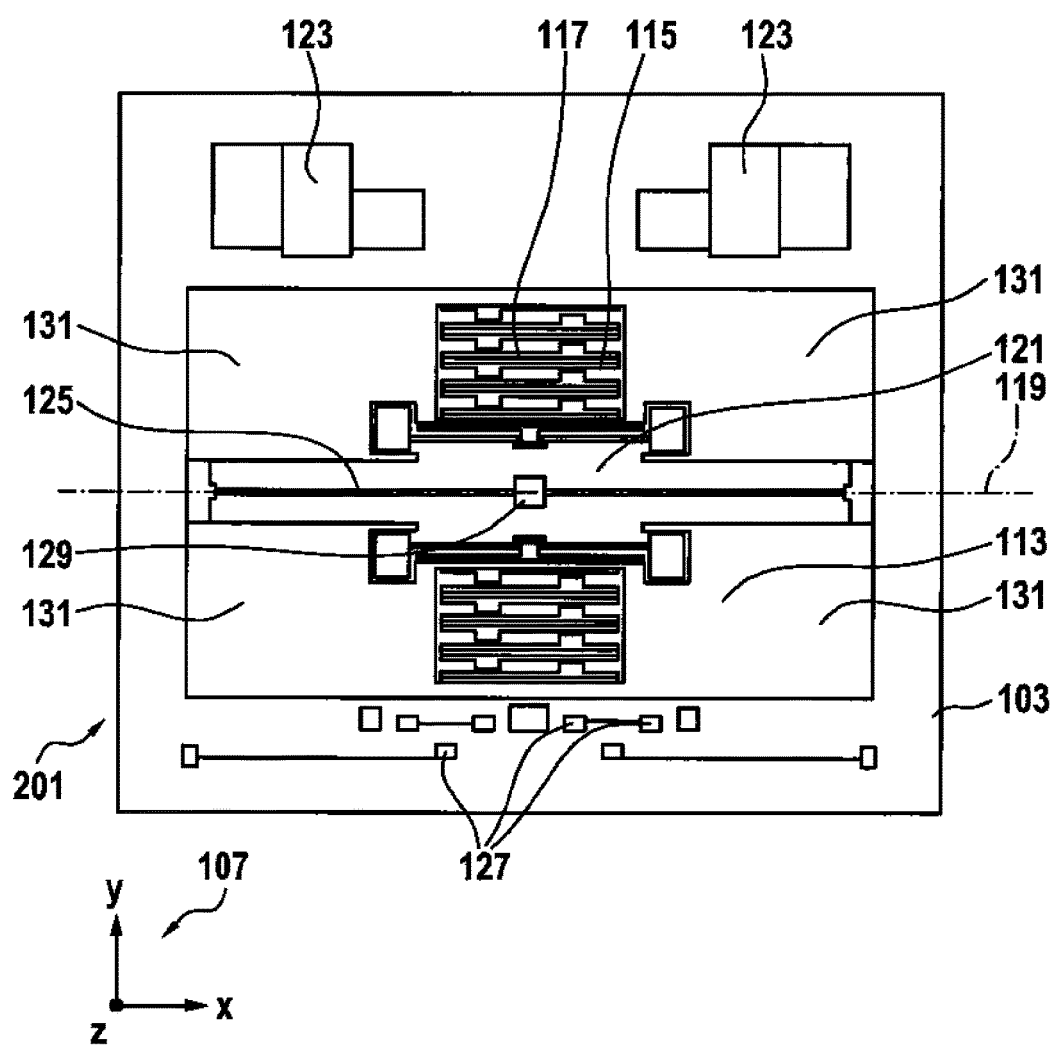
FIG. 6 shows a further view of the micromechanical acceleration sensor from FIG. 2.

FIG. 6 shows a further view of micromechanical acceleration sensor 201 from FIG. 2.

In the above exemplary embodiments, an x-acceleration effect was measured with the aid of first seismic mass 105. Second seismic mass 113 was utilized to measure a y-acceleration effect and a z-acceleration effect. This is not limiting but just an example. In the specific embodiments not depicted it is provided that a y-acceleration effect is measured by first seismic mass 105, and an x-acceleration effect and a z-acceleration effect with the aid of second seismic mass 113. The further combinations are likewise provided as long as a single-axis acceleration effect is measured with the aid of the one seismic mass, and the two remaining axis acceleration effects are measured with the aid of the other seismic mass.

What is claimed is:

1. A micromechanical acceleration sensor, comprising:
   a substrate;
   a first seismic mass, of the sensor, movably suspended on the substrate and deflectable in response to an acceleration acting on the substrate in a first direction;
   a first detection device, of the sensor, for detecting a deflection of the first seismic mass in response to the acceleration acting on the substrate in the first direction;
   a second seismic mass, of the sensor, movably suspended on the substrate and deflectable in response to an acceleration acting on the substrate in a second direction, the second direction running perpendicularly to the first direction;
   a second detection device, of the sensor, for detecting a deflection of the second seismic mass in response to the acceleration acting on the substrate in the second direction, wherein the second seismic mass is deflectable in response to an acceleration acting on the substrate in a third direction, and wherein the third direction runs perpendicularly to the first direction and to the second direction;
   a third detection device, of the sensor, for detecting a deflection of the second seismic mass in the acceleration acting on the substrate in the third direction; and
   fixed stops for an overload condition, the fixed stops being connected to the substrate;
   wherein the second seismic mass is rotationally deflectable about an axis of rotation, which extends perpendicularly to the third direction,
   wherein in a rotation in the third direction, the second seismic mass tilts about the axis of rotation, which extends through the second seismic mass,
   wherein a mass distribution of the second seismic mass is asymmetrical in relation to the axis of rotation wherein the second seismic mass is movably suspended on the substrate by a torsion spring, and wherein the axis of rotation extends through a longitudinal direction of the torsion spring.

2. The micromechanical acceleration sensor as recited in claim 1, wherein the first seismic mass is deflectable in a translatory manner in the first direction, exclusively.

3. The micromechanical acceleration sensor as recited in claim 1, wherein the second seismic mass is deflectable in a translatory manner in the second direction in response to the acceleration acting on the substrate in the second direction.

\* \* \* \* \*